United States Patent [19]
Miyazaki et al.

[11] Patent Number: 5,726,551
[45] Date of Patent: Mar. 10, 1998

[54] BATTERY CHARGING DEVICE HAVING TIME SHARED CHARGING CYCLE

[75] Inventors: Taizou Miyazaki; Ryoso Masaki, both of Hitachi; Satoru Kaneko, Urizura; Tatsuo Horiba, Hitachi, all of Japan

[73] Assignee: Hitachi, Ltd., Japan

[21] Appl. No.: 734,072

[22] Filed: Oct. 21, 1996

[30] Foreign Application Priority Data

Oct. 19, 1995 [JP] Japan ................. 7-270879

[51] Int. Cl.$^6$ ................. H01M 10/46
[52] U.S. Cl. ................. 320/6; 320/15; 320/21
[58] Field of Search ................. 320/6, 8, 12, 13, 320/15, 21, 22, 30, 61, 65, 64

[56] References Cited

U.S. PATENT DOCUMENTS

| | | | |
|---|---|---|---|
| 4,689,531 | 8/1987 | Bacon | 320/14 X |
| 5,003,244 | 3/1991 | Davis, Jr. | 320/17 |
| 5,055,763 | 10/1991 | Johnson et al. | 320/15 |
| 5,130,634 | 7/1992 | Kasai | 320/22 |
| 5,187,422 | 2/1993 | Izenbaard et al. | 320/15 X |
| 5,237,258 | 8/1993 | Crampton | 320/14 |
| 5,241,258 | 8/1993 | Cheon | 320/23 |
| 5,254,930 | 10/1993 | Daly | 320/15 |
| 5,523,668 | 6/1996 | Feldstein | 320/6 |

FOREIGN PATENT DOCUMENTS

| | | |
|---|---|---|
| 0 607 041 | 7/1994 | European Pat. Off. . |
| 0 665 627 | 8/1995 | European Pat. Off. . |
| 2 004 140 | 3/1979 | United Kingdom . |

*Primary Examiner*—Edward Tso
*Attorney, Agent, or Firm*—Evenson, McKeown, Edwards & Lenahan, P.L.L.C.

[57] ABSTRACT

A battery charging unit is provided with a charge controlling unit which is designed to perform at least one of rest mode operating function which causes to rest charging for respective battery, groups and discharge mode operating function which causes to discharge electric power from the respective battery groups in addition to charge mode operating function for the respective battery groups, the battery charging unit controls charging for the respective battery groups through the charge controlling unit while repeating at least two modes including the charging mode among the charging mode, rest mode and discharge mode in a predetermined time cycle and further performs a mutual control between the respective battery groups so that at least one battery group is placed in the rest mode in a predetermined sequence during the operation thereof, thereby, drawbacks of a conventional pulse like charging and burp charging, which are suitable for a quick charging but requires a large instantaneous charging current which causes the size increse of the charging unit and the electric circuit concerned, are eliminated.

18 Claims, 6 Drawing Sheets

I~IV ARE REFERENCE NUMBERS REPRESENTING RESPECTIVE CONDITIONS (PRESENT INVENTION)

(CONVENTIONAL MEASURE)

BATTERY CHARGING DEVICE HAVING TIME SHARED CHARGING CYCLE

BACKGROUND OF THE INVENTION

The present invention relates to a battery charging device to be connected to an electric load, for example, in an electric vehicle, and, in particular, to a battery charging device which permits quick charging and realizes a size reduction.

It is well known in the art that when a battery is charged by repeated charging and resting for a short interval, a quick charge can be realized with a large current without subjecting the battery to a large burden.

U.S. Pat. No. 5,003,244 discloses a "battery charger for charging a plurality of batteries" wherein a plurality of battery chargers are assigned to a plurality batteries for charging the same and every charging voltage for respective battery groups is kept uniform to effect an overcharging protection.

With the above mentioned "pulse" charging method, total charging time is shortened because a large current is permitted to flow through the batteries. However, because of the existence of the charging rest period, it is necessary to flow momentarily a large current to compensate the rest period. Accordingly, the pulse charging method requires a battery charger which permits a large current supply and an electric circuit which permits such a large current to flow, which is problematic in that the size of the charging circuit is increased, because depending on the current increase the size and weight of both the battery charger and the electric circuit increase.

SUMMARY OF THE INVENTION

An object of the present invention is to provide a battery charging device which permits a quick charging without increasing the size of a related charging circuit.

Another object of the present invention is to provide an electric vehicle mounting a battery charging device which permits a quick charging without increasing the size of a related charging circuit.

A battery charging device according to the present invention which achieves the above objects comprises: a plurality of battery groups electrically connected each other; a plurality of battery charging units which charge the respective battery groups; and an electric load which is driven by energy from the battery groups. Each of the battery charging units is provided with a charge controlling unit designed to perform a rest mode operating function (which causes a pause in the charging of the corresponding battery group) and a discharge mode operating function (which causes discharge of electric power from the corresponding battery group), as well as a charge mode operating function to control charging of the corresponding battery group, repeating at least two modes, including the charging mode (as among the charging mode, rest mode and discharge mode) in a predetermined time cycle. It also performs a mutual control between the respective charge control units, so that at least one battery group is placed in the rest mode in a predetermined sequence.

Other objects, advantages and novel features of the present invention will become apparent from the following detailed description of the invention when considered in conjunction with the accompanying drawings.

DETAILED DESCRIPTION OF PREFERRED EMBODIMENTS

Hereinbelow, an embodiment according to the present invention which is applied to a charging device for batteries used for driving an electric vehicle is explained with reference to the drawings.

Figure 1:
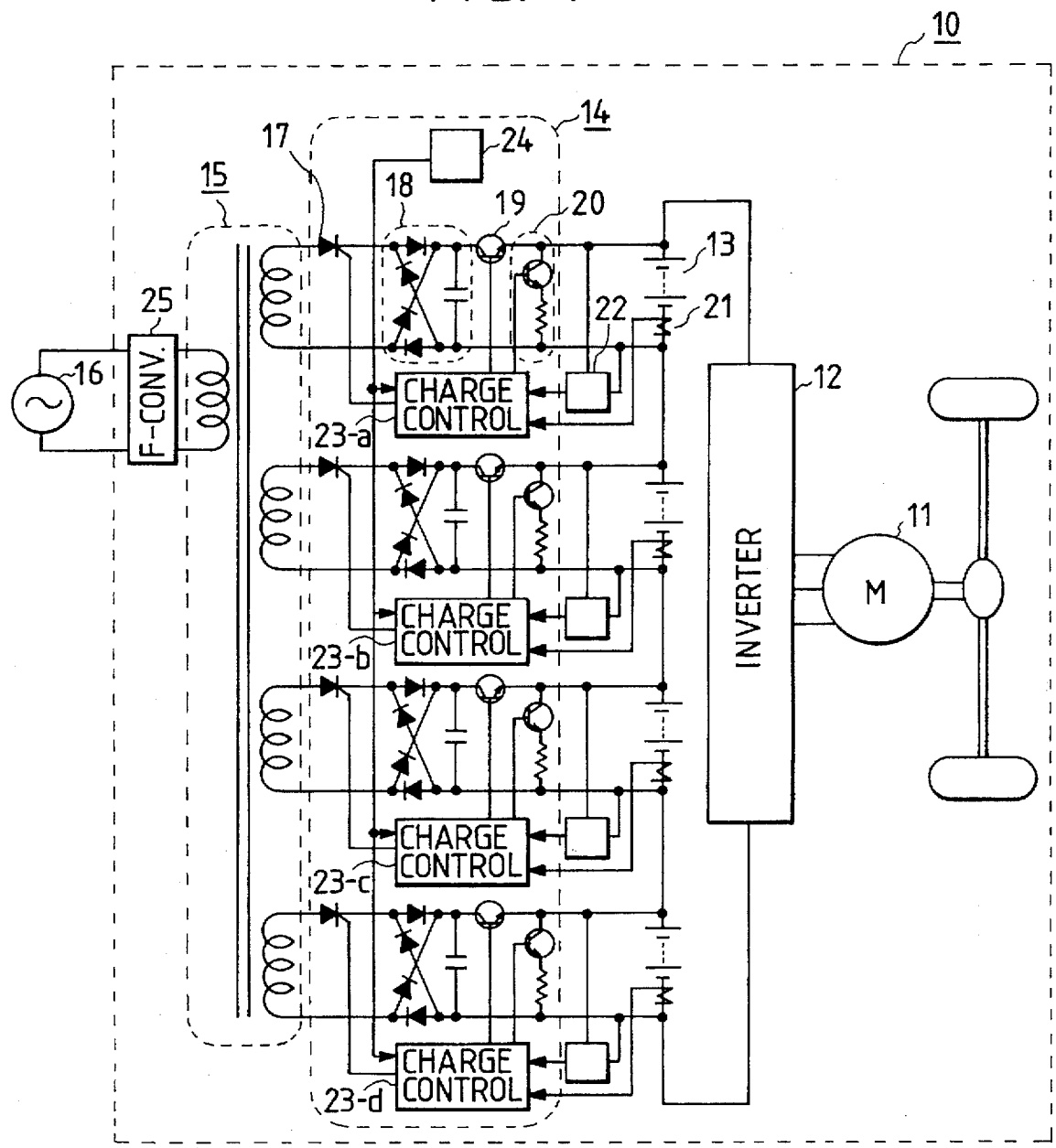
FIG. 1 is a schematic diagram showing one embodiment of a battery charging device and an electric vehicle mounting the same according to the present invention.

FIG. 1 is a diagram showing schematically an electric vehicle and a battery charging system therefor according to the present invention.

In the drawing, numeral 10 represents an electric vehicle which includes a motor 11 for driving vehicle wheels and an inverter 12 for driving the motor 11. A plurality of battery groups 13, which serve as a power source for driving the inverter 12 are charged by a battery charging unit 14. A transformer 15 feeds an electric power to the battery charging unit 14 after boosting the voltage applied thereto, and an external AC power source 16 supplies a primary current to the transformer 15.

The battery charging unit 14 is constituted by change-over circuits 17 each of which is controlled by a charge controlling unit (explained later) which connects and disconnects the transformer 15, rectifier circuits 18, charging voltage controlling circuits 19, each of which controls the charging voltage of the corresponding battery group 13, and discharge voltage control circuits 20. Numerals 21 are current sensors, numerals 22 are voltage detectors, numerals 23-a, 23-b, 23-c and 23-d are charge controlling units, numeral 24 is a time dependent variable signal generator and numeral 25 is a frequency converter.

The electric vehicle 10 is driven by the motor 11 via the motive force thereof. The DC power from the respective battery groups 13 is converted via the inverter 12 into an acceptable power for the motor 11. In the present embodiment each of the battery groups 13 is constituted by a plurality of batteries connected in series, and four such battery groups 13 are shown. However, the number of battery groups 13 is not limited to four, and the connection of these battery groups 13 is not limited to the series connection as illustrated.

During the battery charging operation, an AC power obtained from the external AC power source 16 is transformed by the transformer 15 into a voltage appropriate for charging the respective battery groups 13. The transformer 15 has a single pair of primary terminals and several pairs of secondary terminals. The electric power transformed by the transformer 15 is controlled by the battery charging unit 14 to a voltage-current appropriate for charging the respective battery groups 13. The transformer 15 and the battery charging unit 14 are connected and disconnected via the change-over circuits 17. The AC power output from the transformer 15 is rectified by the respective rectifier circuits 18, converted by the respective charge voltage controlling circuits 19 into a voltage appropriate for the charging and is used to charge the respective battery groups 13.

The respective change-over circuits 17, the charge voltage controlling circuits 19 and the discharge voltage controlling circuits 20 are controlled by the corresponding charge controlling means 23-*a*, 23-*b*, 23-*c* and 23-*d*. Further, in order to monitor the internal conditions of the respective battery groups 13 the respective charge controlling means 23-*a*, 23-*b*, 23-*c* and 23-*d* receive input signals from the current sensors 21 and the voltage detectors 22. These input signals are used for performing a constant voltage charging or a constant current charging (explained later) and for detecting a fully charged condition of the respective battery groups 13. For example, when a voltage for a certain battery group 13 exceeds a predetermined voltage, it is judged that it has reached to the fully charged condition, and the corresponding one of the charge controlling means 23-*a*, 23-*b*, 23-*c* and 23-*d* commands the corresponding change-over circuit 17 to disconnect the battery charging unit 14 from the transformer means 15.

In general, the charge voltage controlling circuit 19 performs either a constant voltage charging or a constant current charging depending on the charging condition of the corresponding battery group 13. For constant voltage charging the charge voltage control circuit 19 is, for example, controlled through a chopping control, while for constant current charging the charging voltage is controlled so that a constant current flows, by feeding back the output from the current sensors 21. It is sufficient to use conventional circuits for these controls, which are also used for the control of the discharge voltage control circuit 20.

The time dependent variable signal generating unit 24 transmits time reference signals to the battery charging unit 14. Because charging of the respective battery groups 13 is performed by repeated charging, discharging and resting in a predetermined time cycle, the battery charging unit 14 requires the time reference signals.

Further in the present embodiment, the changeover circuit 17 and the charge voltage controlling circuit 19 are realized by separate circuits for safety reasons; however, the charge voltage controlling circuit 19 can also be used to serve as the changeover circuit 17.

In the present invention, a plurality of batteries are divided into a plurality of groups, which are successively connected to the side of the battery charger in a time sharing manner. Hereinafter, therefore, the method employed in the present invention is called a "time sharing changing-over charging method".

The frequency converter 25 converts the frequency of the AC power source to a high frequency. Since the size of a transformer can generally be reduced, depending on frequency, in the present embodiment the frequency converter is formed by combining a customary converter and inverter.

Hereinbelow, an exemplary operation of the charge control means 23-*a*, 23-*b*, 23-*c* and 23-*d* is explained with reference to FIG. 2 and Table 1 below. Now, it is assumed that the battery charging method is a combination of a burp charging and a constant current charging. "Burp charging" is a well known pulse charging method having an improved charging efficiency, in which a momentary battery discharging period is provided during change-over from the charging period to the resting period. Further, it is assumed that in the burp charging method, the charging period is equated with the resting period, the discharging period is extremely short in comparison with the charging period, and the absolute value of the discharging current is substantially the same as that of the charging current.

Figure 2:
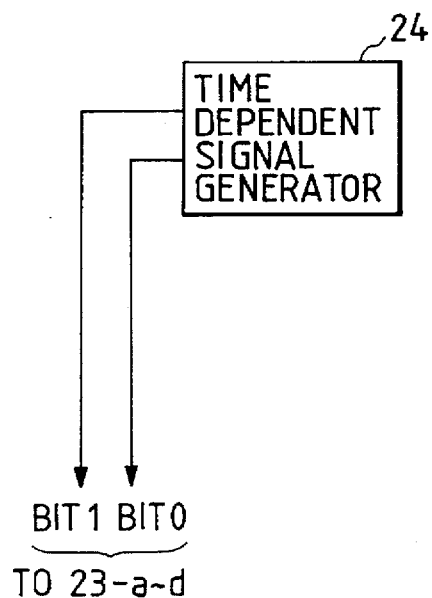
FIG. 2 is a schematic diagram showing an exemplary output of a time dependent variable signal generator 24 in FIG. 1.
Figure 3A:
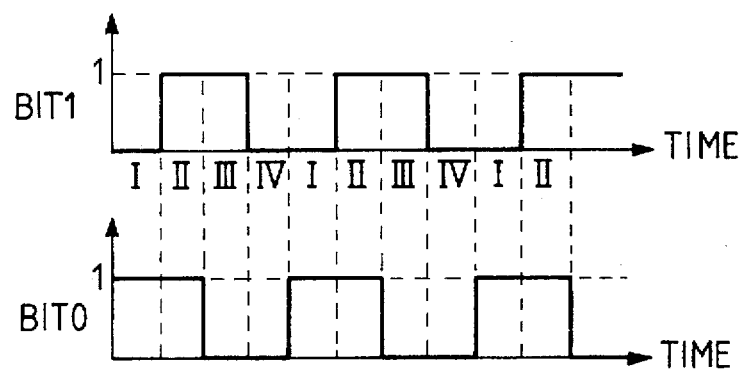
FIGS. 3A and 3B are waveform diagrams showing time dependent variable signals outputted from the signal generator shown in FIG. 2.
Figure 3B:
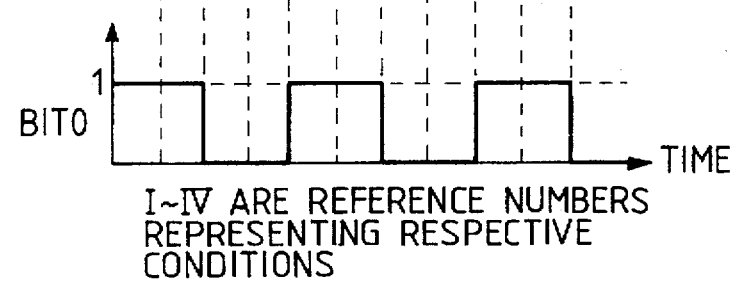

FIG. 2 is an example of signals generated from the time dependent variable signal generating means 24 under the preconditions as explained above. In the present embodiment, these digital signals from two terminals as illustrated in FIG. 2, are designated represented as bit 0 and bit 1, and are generated in a pattern as illustrated in FIGS. 3A and 3B. These signals are output to the four charge controlling means 23-*a*, 23-*b*, 23-*c* and 23-*d* as illustrated in FIG. 1. In Table 1, four conditions I through IV which are determined depending on variation of these time dependent variable signals are defined. The charge control means 23-*a*, 23-*b*, 23-*c* and 23-*d* vary their operating conditions as illustrated in Table 1.

TABLE 1

| Operation of Charge Controlling Means | | | | | |
|---|---|---|---|---|---|
| Operation of Time Dependent Variable Signal Generating Means 24 | bit 1 | 0 | 1 | 1 | 0 |
| | bit 0 | 1 | 0 | 1 | 0 |
| | condition | I | II | III | IV |
| Operation of Charge Controlling Means 23 | 23-a | Constant Current Charge Mode | Constant Current Charge Mode | Rest After Momentary Discharge Mode | Rest Mode |
| | 23-b | Rest Mode | Constant Current Charge Mode | Constant Current Charge Mode | Rest After Momentary Discharge Mode |
| | 23-c | Rest After Momentary Discharge Mode | Rest Mode | Constant Current Charge Mode | Constant Current Charge Mode |
| | 23-d | Constant Current Charge Mode | Rest After Momentary Discharge Mode | Rest Mode | Constant Current Charge Mode |

According to the operations in Table 1, the respective battery groups 13 are supplied with the currents illustrated in FIGS. 4A through 4D. In each of these drawings, the abscissa indicates time, and the ordinate indicates current flowing through the respective battery groups 13. The direction of current flow for charging the batteries is designated as positive, and the magnitude of the current for every battery group 13 as I.

FIGS. 4A through 4D show that the battery groups 1 through 4 repeat charging and discharging successively. The rest periods of the respective battery groups 1 through 4 are uniformly distributed along the time axis, and one of four battery groups 1 through 4 is always in either the rest period or the momentary discharge period at respective operating conditions. Combining all of the charging patterns as illustrated in FIGS. 4A through 4D, as depicted in FIG. 4E shows that a total charging current of about 2I flows for the entire battery groups 1 through 4, except for the momentary discharge periods.

Figure 4A:
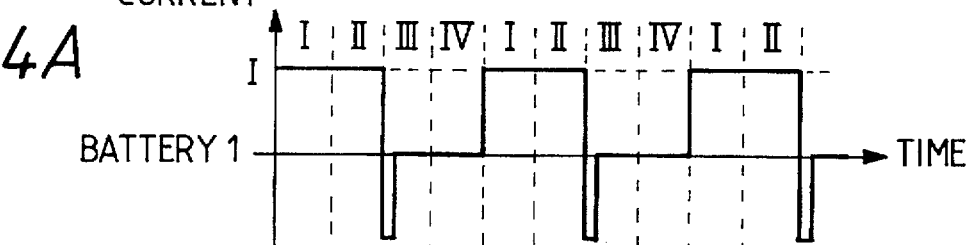
FIGS. 4A through 4E are waveform diagrams showing exemplary battery charging currents according to the present invention.
Figure 4B:
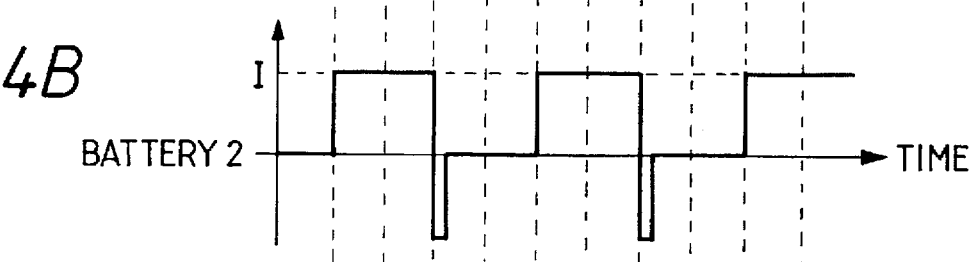
Figure 4C:
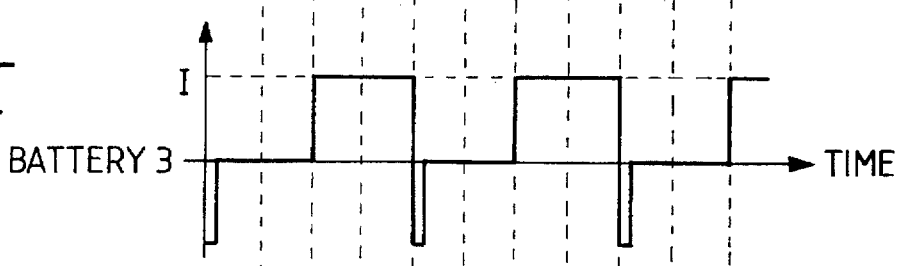
Figure 4D:
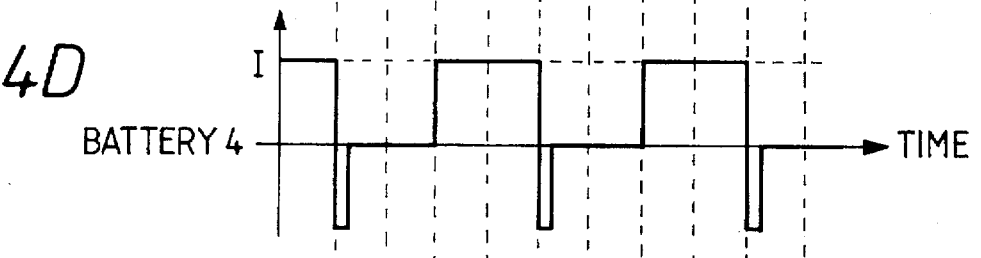
Figure 4E:
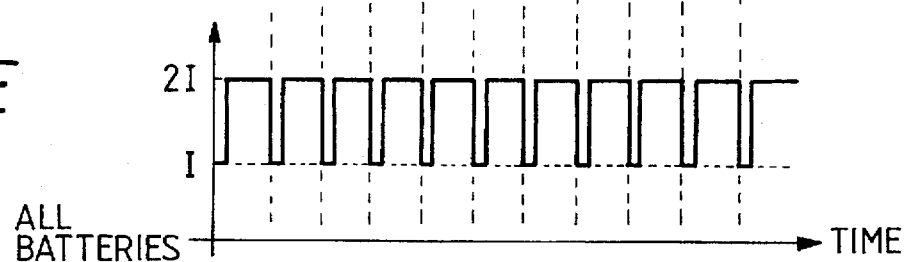
Figure 5A:
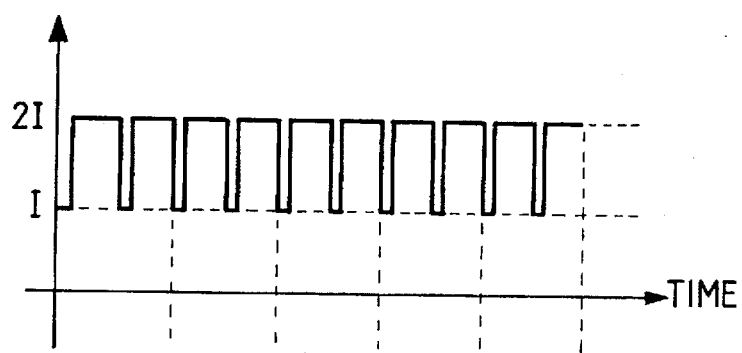
FIGS. 5A and 5B are waveform diagrams showing a comparison between the battery charging currents according to the present invention and a conventional device.
Figure 5B:
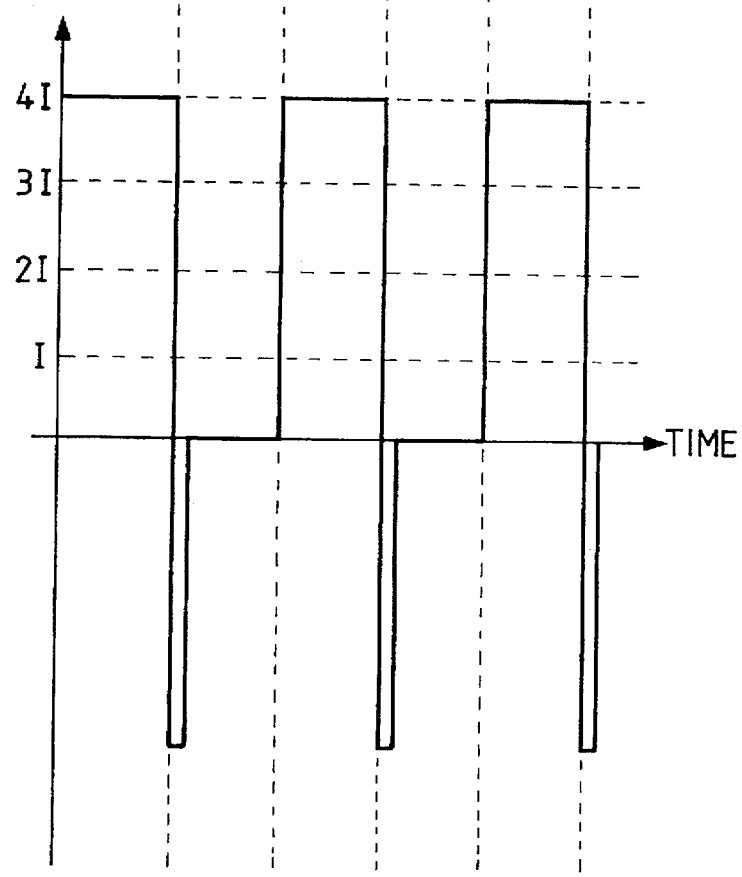

FIG. 5A is a duplicate of FIG. 4E, while FIG. 5B is a waveform of entire charging current according to a conventional constant current burp charging method, without time sharing changing-over charging according to the present invention. This figure is added for the purpose of comparison with the present invention and for explaining its advantages.

Assuming battery charging efficiency of 100%, a charging quantity of a battery is generally expressed as ∫i dt, wherein i is charging current and t is time. Assuming further that the entire time for completing charging according to the charging method as shown in FIG. 5A as T, the entire charging power is 2I×T, because the charging current for the entire battery groups 1 through 4 is taken as 2I (neglecting the discharged power in the momentary short period).

When conventional constant current burp charging is performed for the entire battery groups, the charging current as illustrated in FIG. 5B flows for the entire battery groups, with the ratio between the charging period and the rest period also assumed as 1:1. In this instance, if it is required to complete the charging in the same time T, it is necessary to flow a charging current of 4I as will be understood from FIG. 5B.

In order to flow such a current which varies greatly with respect to time, it is conventional to introduce an inductor and a capacitor into the circuit. However, in an electric vehicle, which requires a large current, it is necessary to introduce an extremely large inductor and capacitor which is unsuitable for a passenger car. For this reason, heretofore a battery charger having a sufficient capacity has been required for burp charging and pulse like charging.

The size and weight of a battery charger and a circuit concerned generally increase depending on the current flowing therethrough. Therefore it will be understood that the present embodiment which requires a smaller current is advantageous from the standpoint of reducing size and weight of an electric vehicle and a battery charger therefor.

For explaining the principle and effectiveness of the present invention, a simple burp charging method and a constant current charging method are combined with the time sharing switching-over charging method according to the present invention. However, even if a further complexed charge control is employed, the time sharing changing-over charging method is more advantageous with respect to size reduction, in comparison with a conventional method. In the time sharing change-over charging method according to the invention, the batteries are divided into a plurality of groups, and during a rest period for a particular battery group another battery group is charged so that there exists no common rest period for all battery groups. For this reason, the magnitude of the instantaneous charging current of the time sharing change-over charging method according to the present invention is necessarily reduced in comparison with that of the pulse like charging method for the entire battery groups. Therefore, if the charging time is the same, the size of the battery charger using the time sharing changing-over charging method can be reduced in comparison with that using the conventional method.

In the above embodiment, the time sharing changeover charging method using the burp charging method is explained. However, the time sharing changing-over can also be performed in a pulse like charging method in which a momentary discharge period during charging is omitted for simplifying the structure thereof. Further, the charge controlling means 23 can be easily modified to perform a constant voltage control by making use of the output from the voltage detecting means 22.

As will be understood from the above, the time sharing changing-over charging method according to the present embodiment of the invention realizes pulse like charging and a burp charging which are suitable for quick charging, without increasing the size of the battery charger concerned. It also reduces the size and weight of an electric vehicle mounting such battery charger permitting quick charging. By making use of the features of the time-sharing changing-over charging method according to the present invention, an advantageous electric vehicle mounting a fuel cell is constituted.

Figure 6:
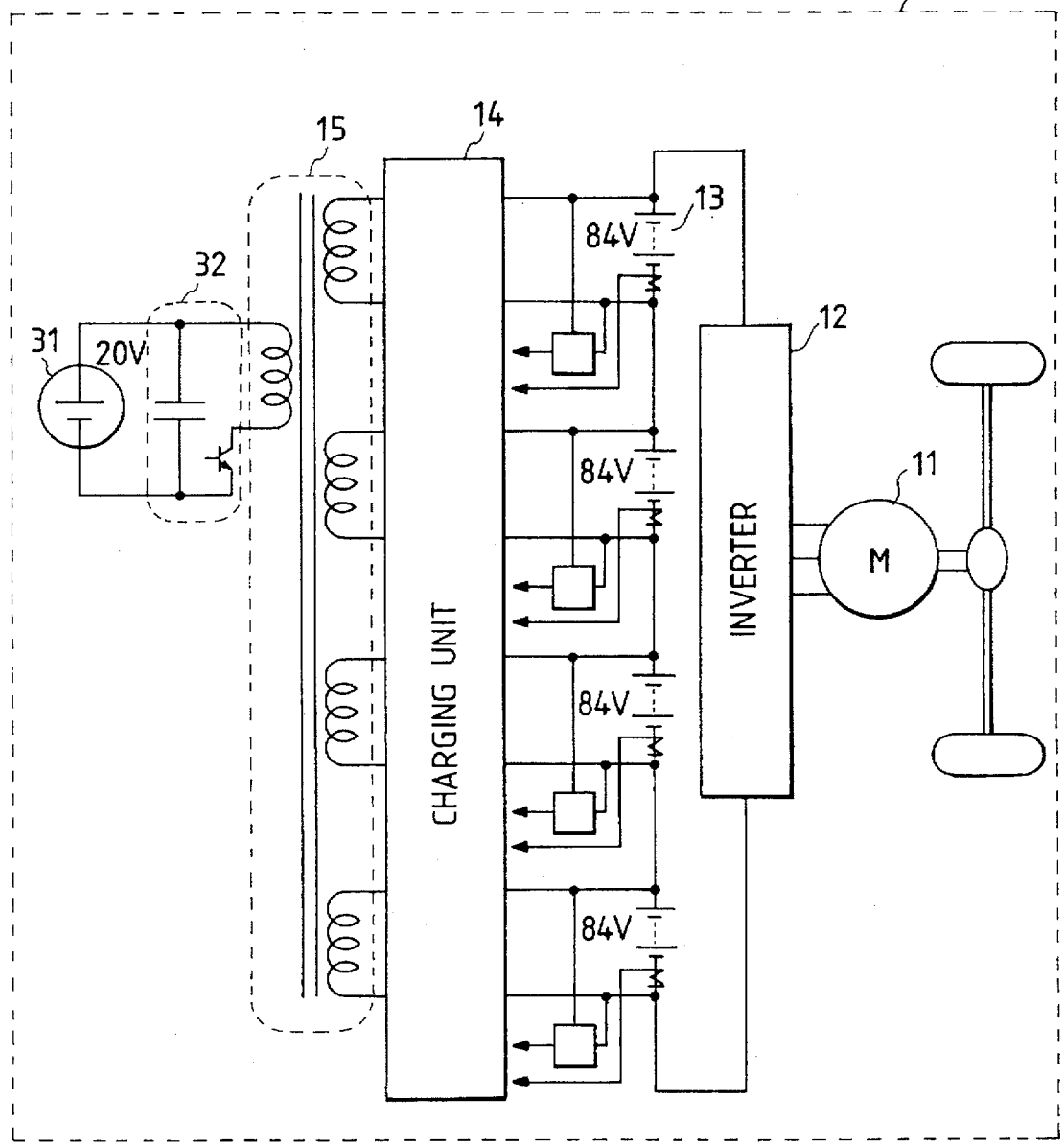
FIG. 6 is a diagram showing another embodiment of an electric vehicle mounting the battery charging device according to the present invention and a fuel cell.

FIG. 6 shows a schematic diagram of another embodiment of an electric vehicle mounting a fuel cell according to the present invention. In this embodiment, numeral 31 represents a fuel cell and numeral 32 represents a DC-AC power conversion means. The electric power output of the fuel cell 31 is converted into AC via the DC-AC power conversion means 32, transferred to the transformer 15 and transformed there to a voltage suitable for charging the battery groups 13. In this embodiment, the transformer 15 has a primary winding and four secondary windings isolated therefrom. The output of the transformer 15 is applied to the battery charging unit 14, converted to a voltage-current pattern appropriate for charging, and is used to the battery groups 13.

In this embodiment, the output voltage of the fuel cell 31 is 20V, and the voltage for the electric vehicle driving lines is 336V. Each of the respective battery groups 13 is constituted by seven batteries connected in series, and four battery groups each having 84V are connected in series for establishing the electric vehicle driving line voltage of 336V.

In the present embodiment, the electric vehicle 10 is a hybrid power source type electric vehicle having a fuel cell and batteries as its energy source. A fuel cell generally stores a large quantity of energy per unit weight; however, it poorly follows a required instantaneous power fluctuation because the fuel of hydrogen and oxygen is supplied in a form of gas, and the flow rate is difficult to momentarily control so as to meet the required electric power generation. For this reason, it is inconvenient to use only a fuel cell for an electric vehicle as a main electric power supply source. A battery can easily follow a required instantaneous power fluctuation in comparison with a fuel cell, but its storable energy per unit weight is low. Accordingly, in the present embodiment, a major part of electric power is stored in the fuel cell 31 and the battery groups 13 are constantly charged by the electric power from the fuel cell 31. The power supply to the inverter 12 is performed via the battery groups 13; therefore, it is possible to meet a sudden large current requirement which may occur when the electric vehicle is required to climb an up-hill or is required to be suddenly accelerated.

Hereinbelow, an advantage when the charging method according to the present invention is applied to the above explained hybrid power source type electric vehicle using the fuel cell is explained.

The battery groups 13 consume energy during cruising of the electric vehicle 10, and must be charged quickly under a small load. The above mentioned pulse like charging method and the burp charging method are suitable for this purpose. However, if all of the batteries are simultaneously subjected to the pulse like charging or the burp charging as in the conventional manner, the charging current suddenly varies as explained in connection with FIG. 5B. A fuel cell cannot meet such a sudden change of charging current as explained above. Therefore, it is difficult to use the pulse like charging or the burp charging which is advantageous for a quick charging.

However, according to the present invention, the instantaneous charging current is distributed by the changing-over operation. Therefore, the charging current is kept substantially constant over the entire charging operation as shown in FIG. 5A. The characteristic of the present invention is very convenient to remedy the drawback of an electric power storage means such as fuel cell which can poorly follow-up to an instantaneous electric power fluctuation.

Figure 7:
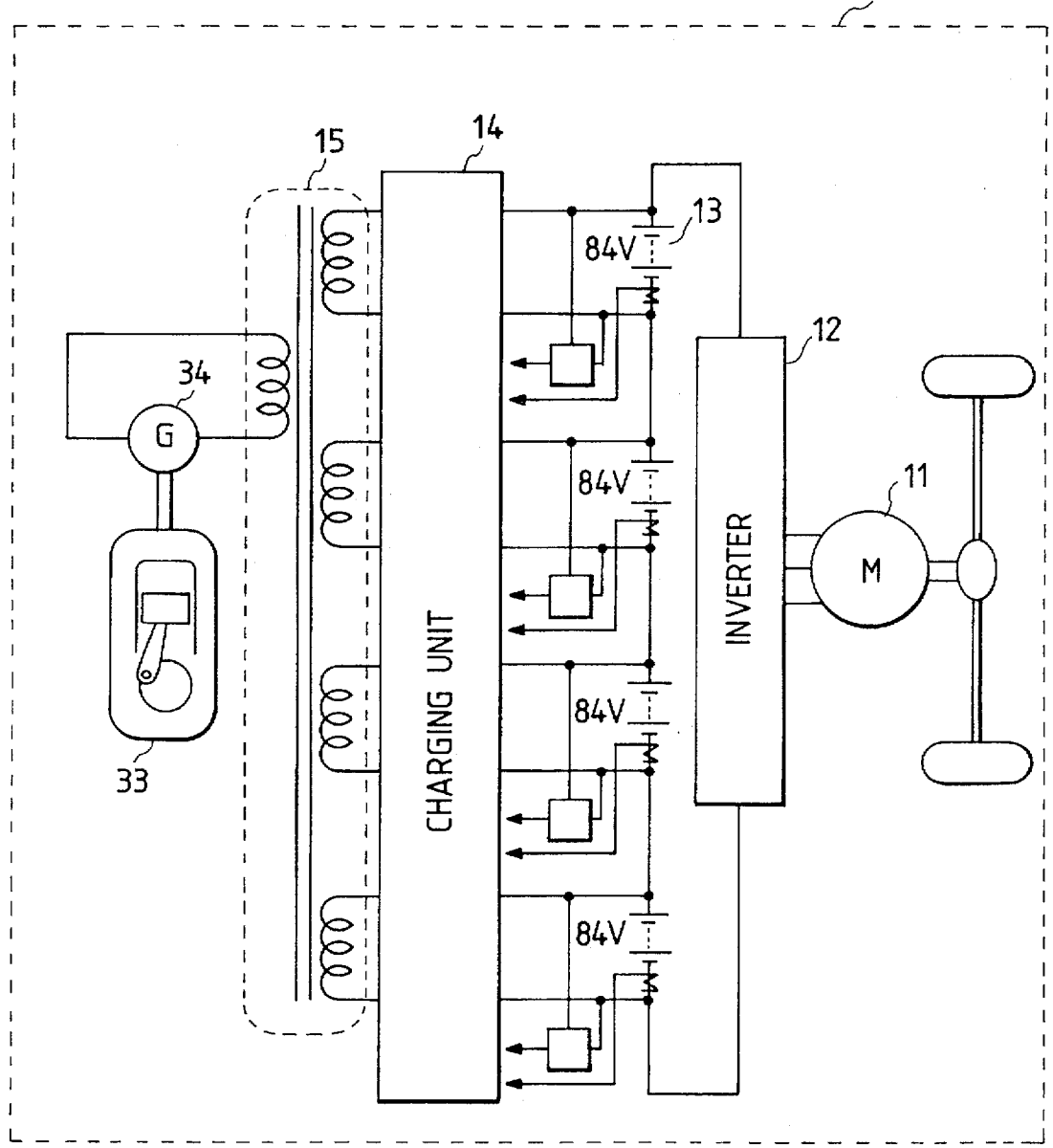
FIG. 7 is a diagram showing still another embodiment of an electric vehicle mounting the battery charging device according to the present invention and an engine generator.

In the above embodiment, the present invention is applied to an electric vehicle mounting a fuel cell. The battery charging device according to the present invention can also be applied, however, to an engine-battery hybrid type electric vehicle. FIG. 7 shows an embodiment of an engine-battery hybrid type electric vehicle to which the present invention is applied. In this embodiment, numeral 30 represents an engine-battery hybrid electric vehicle, numeral 33 represents an engine and numeral 34 represents an electric generator. The engine 33 rotates the electric generator 34 and causes it to output an electric power to the transformer 15.

In the present embodiment, the batteries serve as an auxiliary power source which operates when a large current is momentarily required, such as during acceleration and up-hill climbing. In order to reduce the size of an electric vehicle, it is preferable that the capacity of the batteries be limited to the minimum required level, and that the batteries permit quick charging in a short time, when the engine 33 has a surplus power.

Further, since the efficiency and the amount of the exhaust materials of a heat engine are greatly affected by its operating conditions, it is preferable to operate the heat engine near a maximum efficiency operating point and minimum exhaust material point, with substantially a constant speed.

In this embodiment, the frequency converter (FIG. 1) is omitted, because the AC power frequency generated by the engine generator 34 is presumed to be sufficiently high. For example, assuming that a normal rpm range of the internal combustion engine is 6000 rpm, and number of pole pairs of the engine generator 34 is 8, the frequency of the generated AC power is 800 Hz. Therefore, the size of the transformer can be reduced sufficiently, because the operating frequency in the transformer is sufficiently high in comparison with the commercial frequency of 50 Hz–60 Hz.

On the other hand, if an internal combustion engine which operates at a low rpm is used, the frequency of the generated AC power decreases to a level comparable to the commercial frequency, thereby increasing the size of the necessary transformer. In this case, it is advantageous to provide a frequency converter 25 in order to reduce the size of a battery charger.

With this embodiment of the invention, the fluctuation of the electric power is very small, even though pulse like charging and burp charging suitable for quick charging are used. Therefore, the engine operating condition can be kept substantially constant. Accordingly, an engine-battery hybrid electric vehicle of a desirable efficiency and having batteries of reduced weight can be properly designed.

According to the present invention, a battery charging unit is provided with a charge controlling designed to perform a rest mode operating function (which causes a pause in the charging of the respective battery groups) and a discharge mode operating function (which causes a discharge of electric power from the respective battery groups), as well as a charge mode operating function. A time sharing change over charging operation controls charging for the respective battery groups while repeating at least two modes, including the charging mode (among the charging mode, rest mode and discharge mode) in a predetermined time cycle. It also performs a mutual control between the respective battery groups, so that at least one battery group is placed in the rest mode in a predetermined sequence during the charging operation. In this manner, the necessary instantaneous current is decreased, even though pulse like charging and burp charging suitable for a quick charging, are used. The invention therefore permits a battery charging device of reduced size which nevertheless permits quick charging.

Further, through the application of such battery charging device having a reduce size and permitting a quick charging for an electric vehicle, the size of the electric vehicle is also reduced.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A battery charging device for a plurality of battery groups connected in series, the series connection of the plurality of battery groups being connected across an electric load, comprising:

a plurality of battery charging units, each being coupled to one of said plurality of battery groups for charging the same; and a common battery charging control unit which controls said plurality of battery charging units to effect a charge cycle having a charging mode, short discharge mode and rest mode in a time sharing manner, wherein at least any one of said plurality of battery groups is placed in the rest mode in every moment of the charging operation for said plurality of battery groups.

2. A battery charging device of the type in which a battery arrangement comprising a plurality of battery groups which are electrically connected to each other is charged by repeating a charge cycle comprising at least a charging mode, in which a charging current flows to said battery arrangement, and a rest period in which no current flows, said charging device comprising:

a plurality of charging circuits, each of which is coupled to charge a different battery group of said battery arrangement; and a charge controlling unit for controlling each of said charging circuits to charge the battery group to which it is coupled, according to said charge cycle, said charge cycles for said respective charging circuits being time staggered, whereby each of said charging circuits is sequentially placed in said rest mode while other charging circuits are in said charging mode, according to a predetermined operating sequence.

3. A battery charging device for charging a plurality of battery groups connected in series, the series connection of said plurality of battery groups being connected across an electric load, comprising:

a plurality of battery charging units, each being coupled to one of said plurality of battery groups for charging the same; and a charge controlling unit having an output coupled to each of said battery charging units;

wherein said charge controlling unit causes each of said charging units to perform a charge cycle comprising at least a charging phase and rest phase for said plurality of battery charging units, in a time sharing manner in which the rest phase is implemented successively and sequentially in said plurality of battery charging units.

4. A battery charging device according to claim 3, wherein said charge controlling unit controls the charging quantity for said respective battery groups depending on the charged condition thereof.

5. A battery charging device according to claim 3 further comprising:

a transformer having a primary winding and a plurality of secondary windings and a changing-over means which independently connects and disconnects outputs of the respective secondary windings for the corresponding battery groups.

6. A battery charging device according to claim 5 further comprising a frequency converter connected to the primary winding of said transformer.

7. Battery charging device, according to claim 3 wherein said charge cycle comprises a charging phase, a relatively shorter discharge phase and a rest phase.

8. Battery charging device, according to claim 3 wherein said electric load comprises a unit for driving an electric vehicle.

9. An electric vehicle comprising:

a transformer having a primary winding coupled to an energy source and a plurality of secondary windings;

a plurality of battery groups connected in series, each being coupled to a respective one of the plurality of secondary windings and the series connection of said plurality of battery groups being connected across an electric load for driving the electric vehicle; and a battery charging device which charges said plurality of battery groups, and includes a plurality of battery charging units, each being coupled to one of said plurality of battery groups for charging the same; and a charge controlling unit having an output coupled to each of said battery charging units;

wherein said charge controlling unit causes each of said charging units to perform a charge cycle comprising a charging phase and a rest phase for said plurality of battery charging units, in a time sharing manner in which the rest phase is implemented successively and sequentially in said plurality of battery charging units.

10. An electric vehicle according to claim 9, wherein said charge controlling unit controls the charging quantity for said respective battery groups depending on the charged condition thereof.

11. Electric vehicle according to claim 9 wherein said charge cycle comprises a charging phase, a relatively shorter discharge phase and a rest phase.

12. A fuel cell-battery hybrid type electric vehicle comprising:

a fuel cell;

a plurality of battery groups connected in series, the series connection of said plurality of battery groups being connected across an electric load for driving the electric vehicle;

a battery charging device which is fed from said fuel cell, charges said plurality of battery groups, and includes a plurality of battery charging units, each being coupled to one of said plurality of battery groups for charging the same; and a charge controlling unit having an output coupled to each of said battery charging units;

wherein said charge controlling unit causes each of said charging units to perform a charge cycle comprising a charging phase and a rest phase for said plurality of battery charging units, in a time sharing manner in which the rest phase is implemented successively and sequentially in said plurality of battery charging units.

13. An electric vehicle according to claim 12, wherein said charge controlling unit controls the charging quantity for said respective battery groups depending on the charged condition thereof.

14. An electric vehicle according to claim 12 wherein said battery charging unit further includes a transformer having a primary winding and a plurality of secondary windings and a changing-over means which independently connects and disconnects outputs of the respective secondary windings for the corresponding battery groups.

15. Electric vehicle according to claim 12 wherein said charge cycle comprises a charging phase, a relatively shorter discharge phase and a rest phase.

16. An engine-battery hybrid type electric vehicle comprising:

an engine generator;

a plurality of battery groups connected in series, the series connection of said plurality of battery groups being connected across an electric load for driving the electric vehicle; and a battery charging device which is fed from said engine generator, charges said plurality of battery groups and includes a plurality of battery charging units, each being coupled to one of said plurality of battery groups for charging the same; and a charge controlling unit having an output coupled to each of said battery charging units;

wherein said charge controlling unit causes each of said charging units to perform a charge cycle comprising a charging phase and a rest phase for said plurality of battery charging units, in a time sharing manner in which the rest phase is implemented successively and sequentially in said plurality of battery charging units.

17. An engine-battery hybrid type electric vehicle according to claim 16, wherein said charge controlling unit controls the charging quantity for said respective battery groups depending on the charged condition thereof.

18. Electric vehicle according to claim 16 wherein said charge cycle comprises a charging phase, a relatively shorter discharge phase and a rest phase.

* * * * *